(12) United States Patent
Benson et al.

(10) Patent No.: US 9,504,353 B1
(45) Date of Patent: Nov. 29, 2016

(54) FEEDER SYSTEM AND GRILL COMPONENTS

(76) Inventors: Stephen Howard Benson, Rockford, IL (US); Sean Stephen Benson, Rockford, IL (US)

( * ) Notice: Subject to any disclaimer, the term of this patent is extended or adjusted under 35 U.S.C. 154(b) by 699 days.

(21) Appl. No.: 12/940,972

(22) Filed: Nov. 5, 2010

Related U.S. Application Data

(60) Provisional application No. 61/258,376, filed on Nov. 5, 2009.

(51) Int. Cl.
*A47J 37/07* (2006.01)

(52) U.S. Cl.
CPC ............... *A47J 37/07* (2013.01); *A47J 37/079* (2013.01)

(58) Field of Classification Search
CPC .... A47J 37/07; A47J 37/0763; A47J 37/079; A23B 4/052; A23B 4/044; F24B 13/04
USPC ............ 126/9 R, 25 R, 25 A; 16/110.1, 431; D7/361, 402; D8/107, 300; 222/393; 227/63, 134; 702/675; 273/138.1, 273/138.2, 138.3
See application file for complete search history.

(56) References Cited

U.S. PATENT DOCUMENTS

| | | | | |
|---|---|---|---|---|
| 1,705,548 A * | 3/1929 | Sydow | ..................... | F23B 50/00 110/116 |
| 1,974,789 A * | 9/1934 | Angell | ............... | B65G 53/4683 110/109 |
| 2,985,091 A * | 5/1961 | Hatcher | .......................... | 454/47 |
| 4,249,509 A * | 2/1981 | Syme | ............................. | 126/77 |
| 4,432,334 A * | 2/1984 | Holt | ............... | 126/9 B |
| 4,770,157 A * | 9/1988 | Shepherd et al. | .......... | 126/25 R |
| 4,910,827 A * | 3/1990 | Tandberg et al. | .......... | 15/236.06 |
| 5,133,333 A * | 7/1992 | Stout | .................... | A47J 37/0786 108/35 |
| 5,768,977 A * | 6/1998 | Parris | .................. | A47J 37/0786 126/25 R |
| 6,213,006 B1 * | 4/2001 | Reardon et al. | ................ | 99/446 |
| 6,357,344 B2 * | 3/2002 | O'Grady et al. | ............... | 99/340 |
| 6,834,416 B2 * | 12/2004 | Wang et al. | ..................... | 16/266 |
| 6,935,326 B1 * | 8/2005 | Willis | ........................... | 126/9 R |
| 7,426,885 B2 * | 9/2008 | McLemore | ............ | A23B 4/052 126/59.5 |
| 8,783,242 B1 * | 7/2014 | Banas | ..................... | F24B 13/04 126/223 |
| 2006/0076003 A1 * | 4/2006 | Smolinsky | ............ | A47J 37/067 126/9 R |
| 2007/0028912 A1 * | 2/2007 | Gagas et al. | ................... | 126/9 R |
| 2008/0078374 A1 * | 4/2008 | Polkinghorn | ....... | A47J 37/0786 126/194 |
| 2008/0245356 A1 * | 10/2008 | Chuang | ............... | A47J 37/0694 126/25 R |

* cited by examiner

*Primary Examiner* — Alfred Basichas

(57) ABSTRACT

A Grill including one or more of: (a) Dispenser; (b) Fire Access Door; (c) Cooking Grid Elevator; (d) Ceramic Heat Deflector; (e) Secondary Cooking Grid; and (f) Ceramic Flange as possible components. The Dispenser may include a port opening in the side of the grill sealed by a cap. A Dispenser is adapted for insertion into the port opening and includes a supply shaft. The Dispenser may include a follower rod adapted to advance wood chips or other cooking or smoking mater along the supply shaft. The Fire Access Door is a moving portion of the grids that is hinged via a pivot rod. The Cooking Grid Elevator serves as a raiser bracket that elevates the grids from the surface position of the fire ring. The Ceramic Heat Deflector may also be placed atop the fire ring. The Secondary Cooking Grid may be placed atop the primary cooking grids of the grill thus creating additional grid surface area. The Ceramic Flange, a feature provided by the grill's molding, is located at the top of the grill's ceramic base portion.

9 Claims, 6 Drawing Sheets

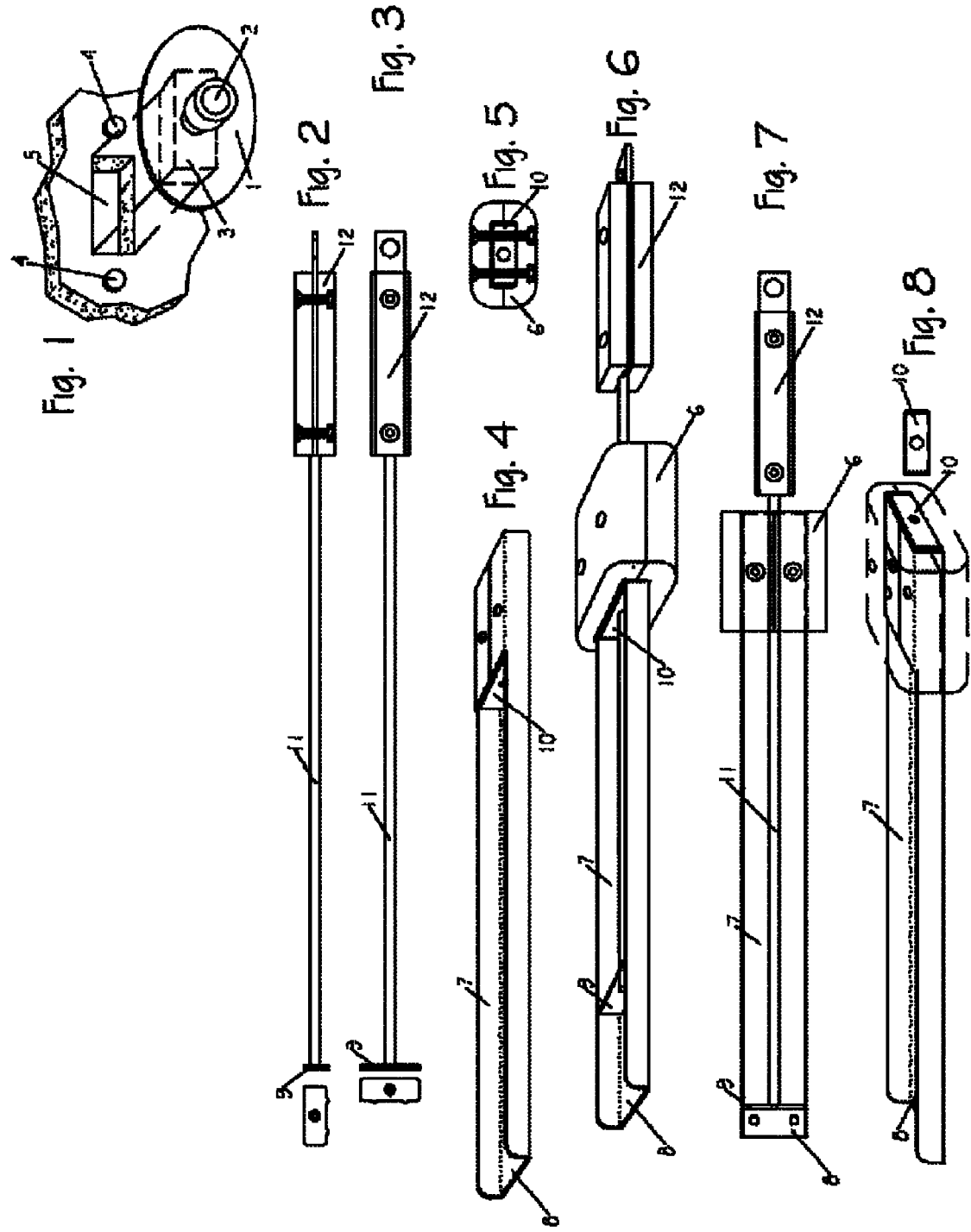

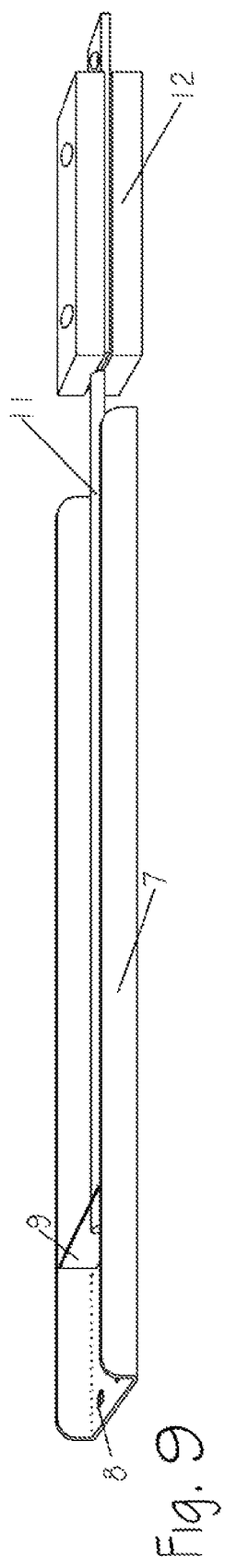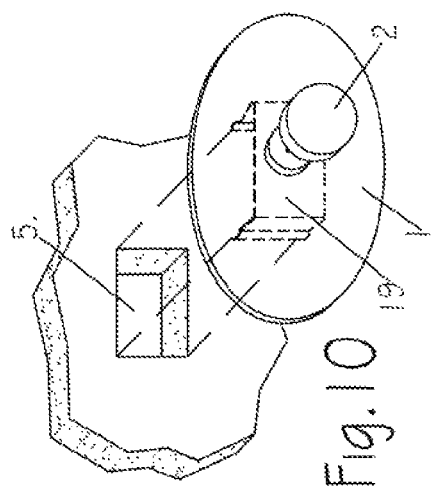

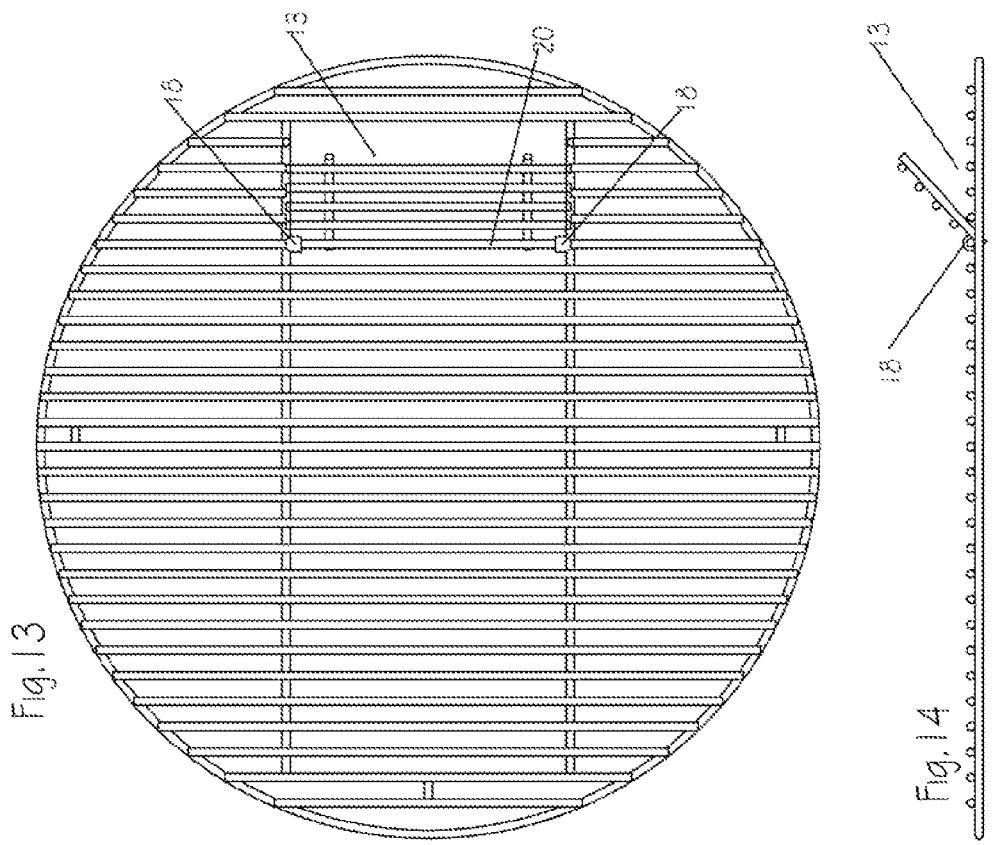
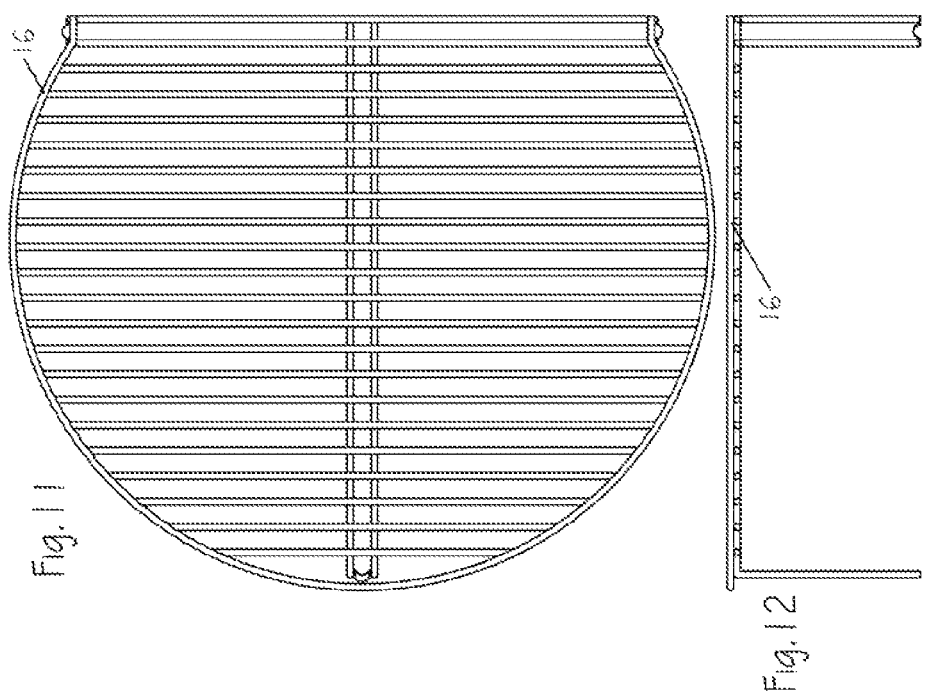

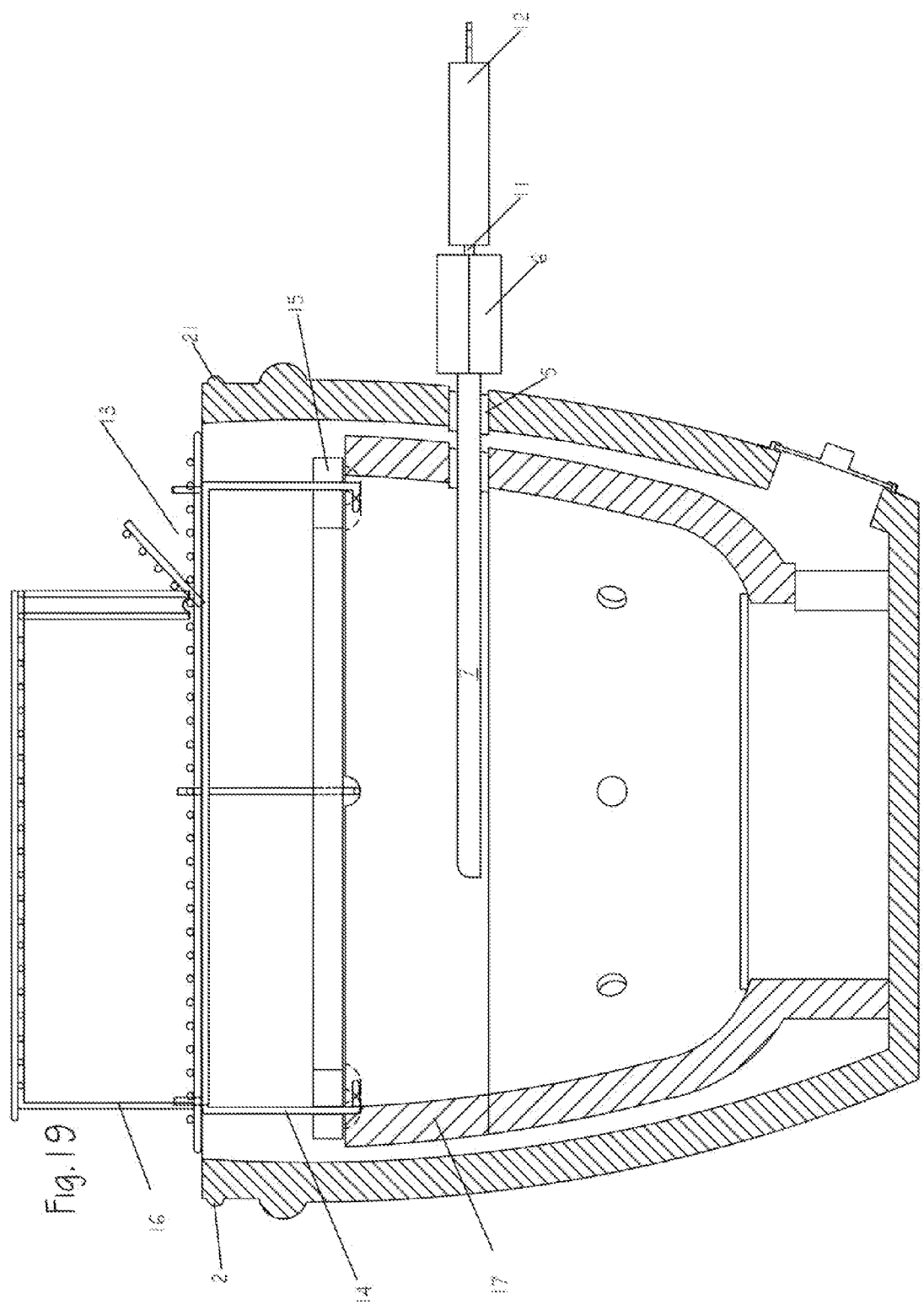

FEEDER SYSTEM AND GRILL COMPONENTS

CROSS-REFERENCE TO RELATED APPLICATION

This application claims the benefit of provisional application 61/258,376 filed Nov. 5, 2009, The contents of which are incorporated herein in their entirety.

FIELD OF THE INVENTION

The present invention relates to cooker grills.

SUMMARY OF THE INVENTION

The following component Inventions pertain to the task of grilling and smoking. In this case the components are demonstrated as accessories to a grill of the domed ceramic category, otherwise classified as kamado. However, elements other than ceramic may be used to construct charcoal and/or other fuel types of grills that may be suitable for these inventions.

According to one exemplary aspect, the present invention provides a Dispenser including a metal channel or tube which is filled with wood chips or other flavoring mater and inserted through the side of the barbeque grill via a fitted port opening located above the heat source, but below the cooking area.

According to another exemplary aspect, the present invention provides a Fire Access Door, which is a hatch in the cooking grids. Such access door provides optional access to the area of the grill below the grids without having to remove said grids or food. In one exemplary configuration this door incorporates a simple hinge unique for cooking grid hatches which remains flat at the pivoting section. The hinge utilizes a pivot rod inserted into a sleeve at each of its two ends.

According to another exemplary aspect, the present invention provides a cooking grid elevator. The Cooking Grid Elevator is an accessory more specific to ceramic kamado grills wherein the elevator part raises the position of the grids from its common resting place to a position level with the opening of the grill.

According to another exemplary aspect, the present invention provides a ceramic heat deflector. In order to provide indirect cooking heat, the Ceramic Heat Deflector is engineered with unique shape for convenient mounting below the area of food placement.

According to another exemplary aspect, the present invention provides a Secondary Cooking Grid built to sit an adequate height above the primary grids so that food may be placed above and below it, with enough space for the grill's head to close above.

According to another exemplary embodiment, the present invention provides a ceramic flange formed on the base of the grill to serve as a securing mechanism to prevent the hinge band from sliding and even disconnecting. All of these components enhance the functionality and versatility of general barbeque cooking and smoking with special consideration regarding kamados.

DESCRIPTION OF THE DRAWINGS

FIG. 1 is a front isometric view of the open access port and cap for a dispenser system.

FIG. 2 is a side elevation view of an exemplary dispenser follower rod.

FIG. 3 is a top view of the exemplary dispenser follower rod.

FIG. 4 is a side isometric view of an exemplary dispenser supply shaft without its supply shaft handle.

FIG. 5 is a rear elevation view of the exemplary supply shaft with supply shaft handle screwed on.

FIG. 6 is a side isometric view of the exemplary supply shaft and supply shaft handle with follower rod and all other parts attached.

FIG. 7 is a top view of the exemplary supply shaft and supply shaft handle with follower rod and all other parts attached.

FIG. 8 is a side isometric view of the exemplary supply shaft with emphasis on the follower rod fastener plates.

FIG. 9 is a side isometric view of an alternative embodiment showing the supply shaft without provision for the supply shaft handle or any other attachments. The separate follower rod is shown positioned independently within the shaft with rod handle and follower plate attached.

FIG. 10 is a front isometric view of an exemplary access port cap with prongs.

FIG. 11 is a top view of exemplary Secondary Cooking Grids.

FIG. 12 is a side elevation view of the exemplary Secondary Cooking Grids.

FIG. 13 is a top view of the primary cooking grids with exemplary Fire Access Door.

FIG. 14 is a side elevation view of the primary cooking grids with exemplary Fire Access Door.

FIG. 19 is a side section view of a charcoal grill including a Secondary Cooking Grid, Cooking Grid Elevator, Ceramic Heat Deflector, Dispenser, and Ceramic Flange.

DESCRIPTION OF PREFERRED EMBODIMENTS

1. Dispenser

Figure 15:
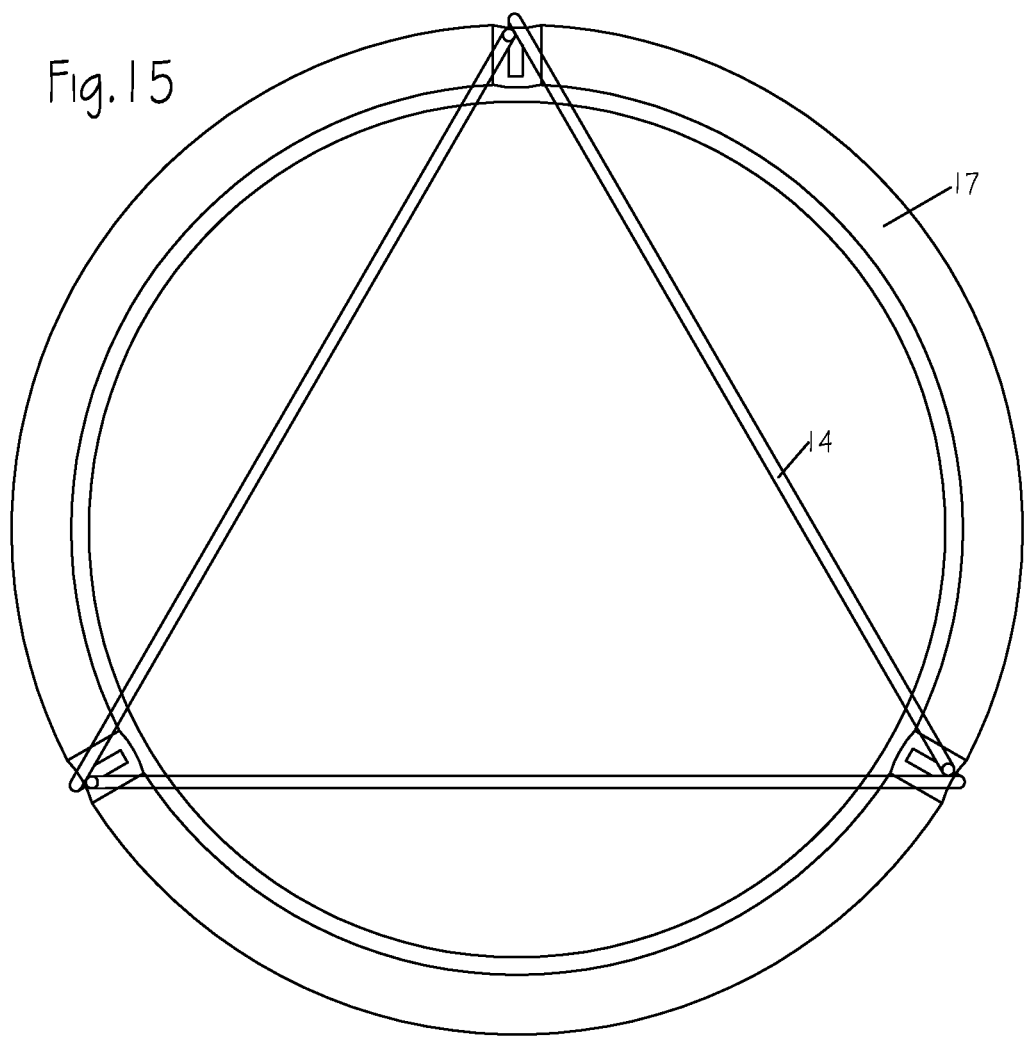
FIG. 15 is a top view of an exemplary Cooking Grid Elevator sitting atop the grill's ceramic fire ring.

The Dispenser is designed for the convenience, of charcoal grillers and smokers. Users of the Dispenser and components will be provided with unique access to the fire area of their grill.

The Dispenser is used by owners/operators of cooking grills and smokers. The purpose of the Invention is to allow persons who are cooking and/or smoking food to dispense wood smoking chips or other flavoring or cooking matter into the heat source area of the grill. The Dispenser allows users to insert and deposit matter without opening the lid of the grill or removing and grids, gates or other items placed above the fire.

The most common design for cooker grills requires that the fire be started first within the lower portion of the unit before the grids/grates and food can be placed above. If smoke is needed after the food has been set on the grill, prior designs require the user to remove the food and cooking grids in order to add wood chips to the fire. It is sometimes possible to drop wood chips through the cooking grids, however, doing so is obviously dangerous and chips frequently stick between the grids and in the food. Attempting to add smoking chips in either of these ways makes the individual vulnerable to burns. In addition, the cooking process is interrupted by opening the lid, which causes the grill to loose heat which would have otherwise remained insulated.

The Dispenser of the present invention is a device through which wood chips or other flavoring or cooking mater may be safely and easily deposited into the fire without removing the cooking grids or even opening the lid. Not having to open the lid allows the grill to maintain its heat and smoke. This way, the Dispenser process is safer and more efficient; also, the risk of getting burns by flame or handling hot grates is avoided.

Referring to the various figures, the exemplary Dispenser System first involves a small access port located on the side of the base of the grill as seen in FIGS. 1 and 19. By way of example only, the port opening 5 may be 2" wide by 1" high. The port opening 5 is located just below the location of the cooking grids. The port door may include a metal cap 1 that covers the entire opening and seals to the outside of the grill via two magnets 4 located on opposing sides of the open port 5, or via a pronged clip, component 19 in FIG. 10, to wedge the cap 1 over the port 5. In the illustrated exemplary configuration the outside portion of the port cap 1 includes a knob 2 for easy removal. The inside portion of the metal cap may be attached with a ceramic port insulator fitting 3 cut to slide snugly within the access port of the grill and long enough to fill the entire depth of the opening, generally about ¾". As illustrated, the access port 5 is located in the side of the grill below the cooking grids, but above the fire grates or source of heat.

Accompanying the Access Port is the Dispenser apparatus as seen in FIGS. 2 through 8 and 19. In the exemplary embodiment the Dispenser includes a steel supply shaft 7 having dimensions such that it will be able to slide into the grill through the open access port 5. The shaft is closed in on all sides excluding the topside and the forward end, creating the dispenser outlet 8. A supply shaft handle 6 encapsulates the back end of the supply shaft 7. The supply shaft handle 6 exceeds the width and height dimensions of the supply shaft 7 so as to serve as a stopping mechanism.

In one exemplary configuration the supply shaft is complimented by an attached steel follower rod 11 that stretches down the length of the supply shaft 7. The follower rod is attached to the dispenser shaft via two fastener plates 10. One fastener plate is attached to the back of the supply shaft 7 and doubles as the backside enclosure. The other fastener plate is attached inside the supply shaft 7 approximately where the forward end of the supply shaft handle 6 ends. The follower rod 11 passes through a small opening at the center of each fastener plate 10 and is headed by a follower plate 9 that is fitted to the inside of the supply shaft 7, but only attached at the forward tip of the follower rod 11. In the exemplary construction the rear tip of the follower rod 11 is connected to a secondary handle of wood, or other heat insulating material, referred to as the rod handle 12. The follower rod 11 is positioned on the supply shaft 7 such that the follower plate 9 and the follower rod handle 12 are on either side of the fastener plates 10 with the follower plate 9 being inside the shaft and the rod handle 12 being outside the shaft. FIG. 9 illustrates an alternative prior art dispenser system where the supply shaft 7 and follower rod 11 are independent independent.

Operation of the Dispenser illustrated in FIGS. 1-8 involves, first, drawing the follower rod handle 12 of the dispenser apparatus back away from the supply shaft 7. This causes the follower plate 9 to slide along the supply shaft 7 away from the dispenser outlet 8 until it is halted against the inside fastener plate 10. The supply shaft 7 may then be filled with matter via its open topside in the area between the dispenser outlet 8 and the follower plate 9. Once the dispenser apparatus is loaded, the port cap 1 of the open access port 5 can then be removed from the opening in the grill. Next, the Supply shaft 7 of the dispenser apparatus may be inserted through the open access port 5 until it is stopped by the wooden supply shaft handle 6. Once inserted, the wooden handle of the follower rod 12 may be taken and pressed forward until it meets the backside enclosure (fastener plate) 10 of the supply shaft 7. This causes the follower plate 9 on the inside of the shaft 7 to be pressed forward until it reaches the edge of the dispenser outlet 8, thus pushing all of the contents out of the shaft 7 and into the fire below. The dispenser apparatus may then be removed from the grill, and the port cap 1 placed back into the open access port 5.

2. Fire Access Door

During cooking and smoking it may be necessary to tend the fire and add wood chunks or charcoal. Once cooking of food has begun, the cooking grids create a barrier to the fire. The purpose of the Fire Access Door is to permit access to the fire without having to remove the grids. Cooking grid hatches are known in charcoal grills. However, a unique attribute of the grid hatch in this case is its sleeve to pivot rod hinge. This is ideal because the hinge sleeves provide minimal surface alteration to the grids.

The exemplary fire access door, seen in FIGS. 13, 14 and 19, is a rectangular hinged section of the cooking grids 13 approximately 3¼" long, 6¼" wide and incorporating of the same thickness and element as the rest of the cooking grids. The door incorporates grid rods that are linked together independently of the other grids that make up the majority surface area. The independent door section is linked to the remainder of the unit by a pivot rod 20 which also forms the last grid bar at the back of the Fire Access Door. Two sleeves 18 flank the pivot rod 20 at each end. The sleeves 18 are a hollowed out portion of the non-pivoting grids into which is inserted the pivot rod 20 at each end. This particular hinge assembly is unique for any cooking grid hatch.

In operation the Fire Access Door may be swung open to allow additional access to the fire below the grids without removing them. The Fire Access Door may then be closed to form an even surface with the rest of the grids and may be cooked upon.

3. Cooking Grid Elevator

Typically the cooking grids of a ceramic smoker sit atop a fire ring 17 or some sort of inner platform that lies recessed below the top opening of the grill's base half. The Cooking Grid Elevator is a separate raised bracket upon which the cooking grids may be placed level with the top, open portion of the base half of the grill, otherwise referred to as the lower lip. This way, the grids are no longer recessed within the grill.

Figure 16:
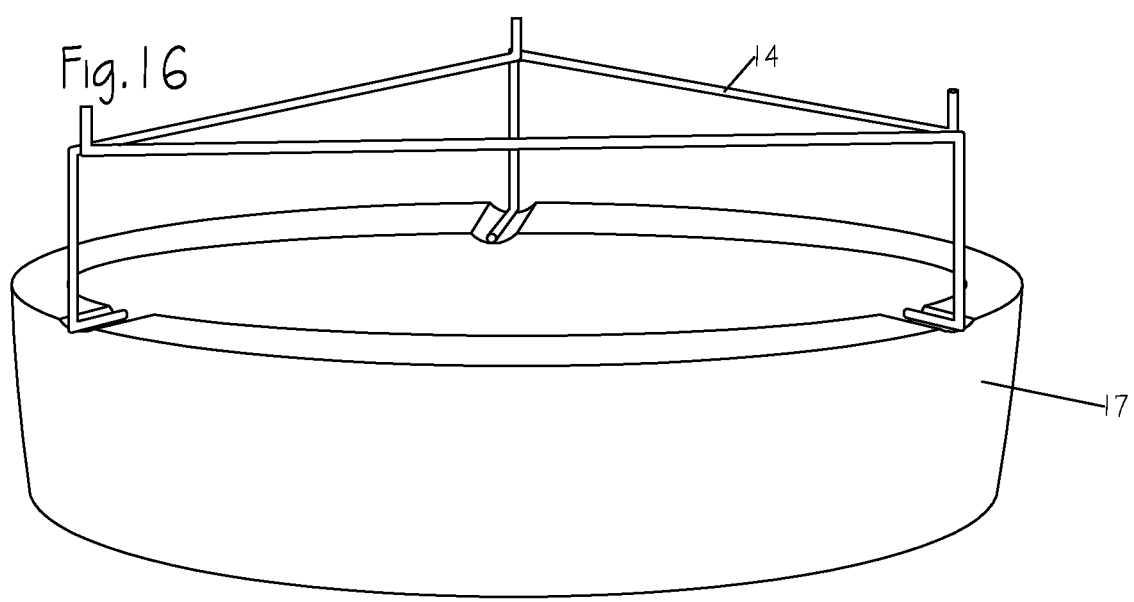
FIG. 16 is a side isometric view of the Cooking Grid Elevator sitting atop the grill's ceramic fire ring.

The Cooking Grid Elevator 14 in FIGS. 15, 16 and 19, is a bracket built with steel bars. The surface of the Cooking Grid Elevator, in its preferred form, is constructed with three bars that are made to form an equilateral triangle. The sides of this triangle have a length necessary to span the inner sides of the grill without obstruction against its walls. At each corner of the bracket's surface is a vertical leg consisting of the same material. The feet of the legs may be placed in indented locations of the fire ring 17. The height of the legs is approximately 4", or of otherwise adequate height to position the triangular bracket at an even level with the lower lip of the grill opening. The top of the bracket preferably includes three prongs that protrude upward and fit between the spaces of the cooking grid to prevent movement.

With the Cooking Grid Elevator 14 placed upon the fire ring 17 where the grids where previously placed, the cooking grids can be securely set atop the steel bracket. The grids will then be at an even level with the lower lip of the grill.

4. Ceramic Heat Deflector

The Ceramic Heat Deflector causes food on its surface to receive heat indirectly from the fire below. Indirect cooking is desirable for roasting and smoking. Ceramics have been used as heat deflectors in the past, but their shape and means by which they are mounted varies. In the past, heat deflectors have been made to be perfectly circular, or have been fashioned with vertical mounting legs. The disclosure, in this case, is flat with three wings that prop it horizontally atop the Fire Ring's surface.

Figure 17:
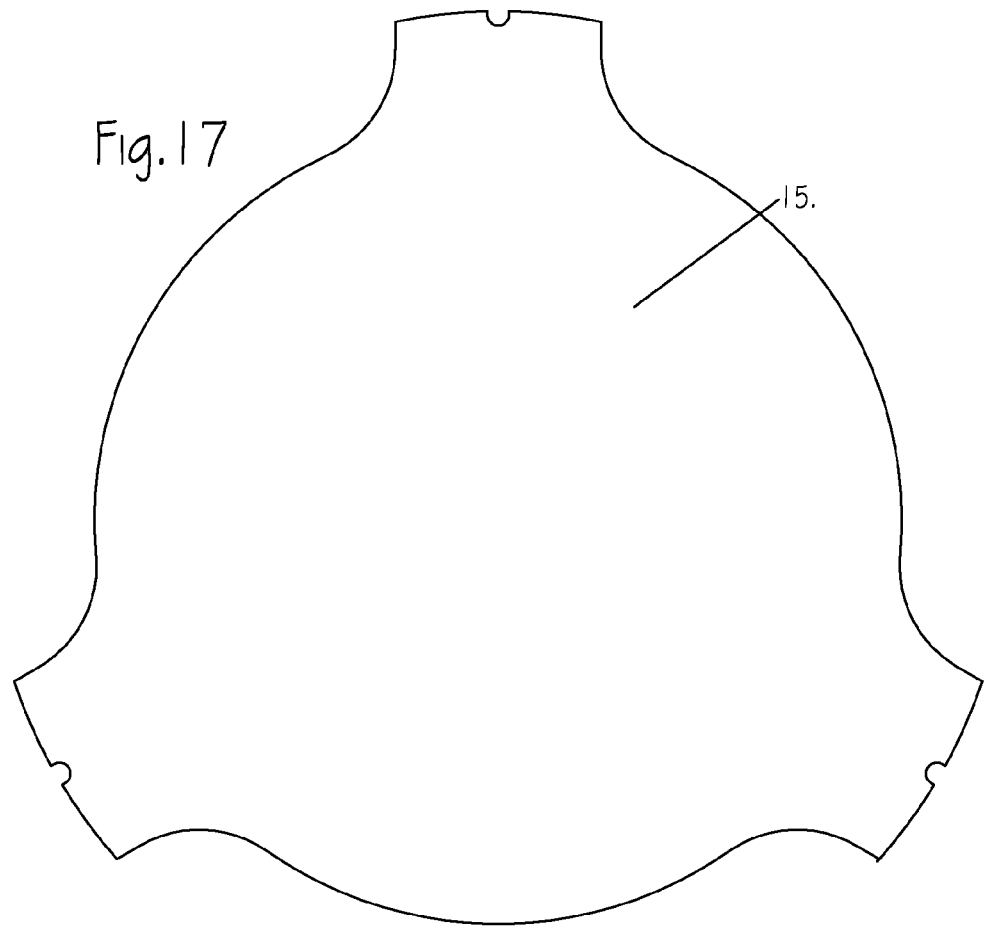
FIG. 17 is a top view of an exemplary Ceramic Heat Deflector.
Figure 18:
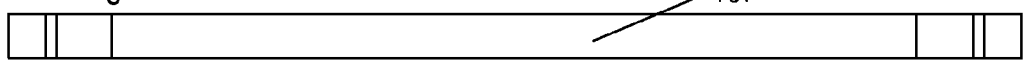
FIG. 18 is a side elevation view of the Ceramic Heat Deflector.

The Heat Deflector 15 in FIGS. 17, 18 and, 19 is preferably a ceramic plate about ¾" thick. The surface is circular except at three sections where the plate's edges wing outward for a distance adequate to sit atop the fire ring 17. The deflector leaves space between the outside edge of its shorter circular portions and the interior of the fire ring 17. The space between the Heat Deflector 15 and the fire ring 17 is approximately 1¼" or of an otherwise necessary distance to provide proportionate open space depending on the inner circumference of the grill.

The Ceramic Heat Deflector 15 prevents anything lying atop its surface from receiving direct heat from the fire/heat source below. However, by leaving open space between the Heat Deflector's 15 circular edges and the fire ring 17, heat is allowed to pass around the ceramic plate and indirectly heat whatever is lying on the surface.

5. Secondary Cooking Grid

The Secondary Cooking Grid creates an additional cooking level within the grill for occasions when more surface area is required for food placement. In the past, accessory cooking grids have come in many shapes and mounting methods. Some, for example, have even been hung from the lid of the grill.

The exemplary Secondary Cooking Grid 16 in FIGS. 11, 12 and 19 is a circular cooking grid with one flat side at its front, which is approximately 13¾" long, so that a complete circle is not formed.

The diameter of the partial circle is short enough to fit within the domed lid at the elevated position created by its legs. A leg piece is located on each end of the straight edge and a third leg is located on the back of the rounded edge at the farthest point from either of the other two legs. The three legs are each formed by two vertically parallel bars, about ½" apart and 4½" long, that meet in a concave formation at the lower end. The concave shape forms to the bars of the lower grids upon which the Secondary Cooking Grid's legs may be placed.

As will be appreciated, the Secondary Cooking Grid 16 is built to sit an adequate height above the primary grids so that food may be placed above and below it with enough space for the grill's head to close above.

6. Ceramic Flange

Commonly, modern ceramic grills have a top dome or lid portion to their structure that is hinged to the bottom portion. The hinging is typically, accomplished by binding the top and bottom ceramic pieces with a metal band and securing those bands to a horizontally mounted hinge. When such a fixture is used, the metal band attached to the base unit has always been located at the very top. The problem with prior design is that no matter how tightly the band is secured, it is always liable to slide off its position, thus, separating the base of the grill from the lid. Separation often occurs after attempting to lift the grill, and can result in parts dropping and breaking.

The Ceramic Flange 21 in FIG. 19 is a slight protrusion created by the ceramic molding. This protrusion ideally spans horizontally around the entire circumference of the grill, and is located near the top of the base ceramic piece In practice, the ceramic flange is preferably located directly above the hinge band that stretches around the grill. The protruding ceramics halt any upward sliding of the secured bands. The Ceramic Flange 21 effectively allows the grill to be lifted and moved via gripping the bands and/or hinge without any separation occurring.

What is claimed is:

1. A grill assembly comprising:
   a body portion adapted to support at least one cooking grid at a position above a heat source;
   an access port located in the side of the body portion, the access port positioned at an elevation between the heat source and the cooking grid;
   a displaceable cover adapted to seal the access port; and
   a dispenser of elongated construction adapted for insertion through the access port and at least partially across the body portion, wherein the dispenser includes a continuously open forward end defining a discharge opening for unobstructed gravity feed delivery of fuel or flavoring material onto the heat source.

2. The grill assembly as recited in claim 1, wherein the dispenser defines an elongated tray having an open top side and forward end.

3. The grill assembly as recited in claim 2, wherein the dispenser has a back end mounted with an insulating handle.

4. The grill assembly as recited in claim 2, wherein the dispenser is accompanied by a follower rod to be slid along the tray lengthwise in order to push contents of the tray off the forward end.

5. The grill assembly as recited in claim 4, wherein the follower rod has a back end which is widened or mounted by an insulating handle.

6. The grill assembly as recited in claim 2, wherein the dispenser is connected with a follower rod adapted to be slid along the tray lengthwise such that the rod is guided along the length of the tray in order to push contents of the tray off the forward end.

7. The grill assembly as recited in claim 1, further comprising a cooking grid elevator, wherein the cooking grid elevator comprises a raised bracket adapted for placement on top of a fire ring with the body portion.

8. The grill assembly as recited in claim 1, further comprising a ceramic heat deflector comprising a substantially flat circular ceramic plate with winged ends adapted for suspended placement at an elevation between said at least one cooking grid and the heat source.

9. A grill assembly comprising:
   A body portion made of ceramic or other insulative material that has an exterior area near to the top rim adapted to have a rigid band of metal or other material wrapped and fixed horizontally around the body portion to serve as a medium for connecting various mechanical components to the ceramic body such as a hinged lid or side shelves or grill stabilizing supports;
   further comprising a ceramic flange comprising a protruding ceramic segment projecting away from an exterior wall of the body portion at an elevation above an area intended for hinge band placement that prevents the band from sliding upward or even coming off over the top of the ceramic body portion.

* * * * *